United States Patent [19]

Fuchs et al.

[11] Patent Number: 4,532,068

[45] Date of Patent: Jul. 30, 1985

[54] METHOD FOR IMPROVING THE INITIAL ACTIVITY OF ACTIVATED HYDRAZINE

[75] Inventors: Wilfried Fuchs, Halle-Neustadt; Horst Richter, Bad Dürrenberg; Vendelin Kaufmann, Leuna; Christina Müller, Leuna; Roland Kober, Leuna; Wolfgang Renker, Leuna, all of German Democratic Rep.

[73] Assignee: VEB Leuna-Werke "Walter Ulbricht", Leuna, Fed. Rep. of Germany

[21] Appl. No.: 474,078

[22] Filed: Mar. 10, 1983

[51] Int. Cl.³ .................... C02F 1/20; C02F 1/70; C09K 15/00; C23F 11/18

[52] U.S. Cl. ................... 252/188.28; 252/389 R; 252/393; 252/400 R; 252/404; 422/14; 423/407

[58] Field of Search .............. 252/188.28, 389.53, 252/400.53, 393, 404; 422/14; 423/407

[56] References Cited

U.S. PATENT DOCUMENTS 3,551,349  8/1967  Kallfass ........................ 252/392
3,808,138  4/1974  Yamaguchi et al. ....... 252/188.28 X
4,026,664  5/1977  Noack ........................ 252/389.53 X
4,278,635  7/1981  Kerst ............................ 252/393 X

FOREIGN PATENT DOCUMENTS 2601466   7/1976  Fed. Rep. of Germany .
3309194  10/1983  Fed. Rep. of Germany .
 160315   6/1983  German Democratic Rep. .
 160345   6/1983  German Democratic Rep. .
75155048  6/1974  Japan .

*Primary Examiner*—Teddy S. Gron
*Assistant Examiner*—Virginia B. Caress
*Attorney, Agent, or Firm*—Jordan and Hamburg

[57] ABSTRACT

The method for improving the initial activity of activated hydrazine is used as corrosion protection for reservoir drinking water and for the wet preservation of installation parts no longer in use. It is the object of the invention to increase the initial activity of hydrazine solutions, activated with complexes of trivalent cobalt, with respect to oxygen dissolved in water, and to develop a suitable method for the activator-rich hydrazine solution. The object is accomplished in that trivalent phenols, preferably pyrogallol, are added in small amounts to the activator-rich hydrazine solution.

10 Claims, No Drawings

METHOD FOR IMPROVING THE INITIAL ACTIVITY OF ACTIVATED HYDRAZINE

BACKGROUND OF THE INVENTION AND PRIOR ART STATEMENT

The invention relates to a method for improving the initial activity of hydrazine with respect to oxygen dissolved in water, with the hydrazine being activated by adding complexes of trivalent cobalt with inorganic ligands as complex constituents. Activated hydrazine is used as an agent to remove oxygen from water, especially from reservoir drinking water and from water used to preserve installations no longer in use, in order to protect containers, pipes, steam boilers, heat exchangers and other installation parts from corrosion.

Various methods have been used to remove oxygen dissolved in water. Hydrazine has been especially preferred which, when adding suitable activators, reacts at low temperatures with oxygen dissolved in water, forming innocuous nitrogen. Cationic and anionic complexes of trivalent cobalt with inorganic ligands as complex constituents are suggested as especially suitable activators (WP C 23 F/224246). Even if these activators are considered favorably, there is still the disadvantage of the concomitantly activated hydrazine not reaching its full reaction velocity with respect to the oxygen dissolved in water, immediately from the start.

It has been suggested to eliminate this deficiency by gassing the activator-rich hydrazine solution with air (WP C 23 F/224247). However, this is disadvantageous in that a separate processing step has to be introduced in order to assure a good initial activity. It is additionally disadvantageous in that the exiting air is burdened with hydrazine vapors when using hydrazine solutions with commercial concentrations, and thus cannot be released into the surrounding air without additional measures.

It is the object of the present invention to improve the initial activity of activated hydrazine with respect to oxygen dissolved in water, in those instances when complexes of trivalent cobalt, with inorganic ligands as complex constituents, are used as activators.

It is thus the object of the invention to develop a suitable activator system, which assures that the hydrazine solution having the aforementioned activators immediately reaches its full reaction velocity with respect to oxygen dissolved in water, eliminating the need for gassing with air.

SUMMARY OF THE INVENTION

This object has been accomplished by the invention in that trivalent phenols are added as coactivators to the activator-rich hydrazine solution in small amounts. These compounds are not sufficiently effective when used as the sole activators for hydrazine, but develop surprising effectiveness only when used together with complexes of trivalent cobalt. Pyrogallol is especially suitable for oxyhydroquinone and phloroglucine are effective as well. It is advantageous that a high reaction velocity is immediately achieved with low amounts. Addition of the noted co-activators in amounts of 0.05 to 0.5 weight percent in relation to the commercial, generally 15-25% hydrazine solution, or in the amount of 5 to 50% by weight, preferably 10%, in relation to the content of the cobalt complex activator, is sufficient. Higher concentrations are possible, but offer no particular advantages. The low addition of organic coactivators prevent the commonly observed disadvantages connected with organic addition. It is of particular advantage that the effectiveness does not decrease with time during the removal of the oxygen. The coactivators are dissolved in the activator-rich hydrazine solution prior to use.

DETAILED DESCRIPTION OF PREFERRED EMBODIMENTS

EXAMPLE 1

0.1 g. of pyrogallol or 0.1 g. of oxyhydroquinone per liter was dissolved in an aqueous hydrazine solution with a content of 220 g. of hydrazine per liter, which had been activated with 0.1 weight percent of pentaminocobalt(III)-chloride or sodium-hexanitritocobalt-(III) respectively. 1 ml of the coactivator-rich solution was mixed with a liter of oxygen-rich water, containing 6 to 7 mg of dissolved $O_2/l$. The oxygen-containing water had previously been set to have a pH-value of 9.3 or 10.5. The temperature was 293° K. After 10 minutes reaction time, the remaining oxygen content was measured. Subsequently, the water was gassed for 10 minutes while adding air, and again provided with oxygen.

This process was repeated several times. The oxygen content was determined immediately following the gassing and after 10 minutes reaction time.

The results are shown in the tables 1 to 4.

TABLE 1

| Catalyst: | 1 g pentaminocobalt-(III)-chloride and 0.1 g pyrogallol/l hydrazine solution | | |
|---|---|---|---|
| | | Remaining oxygen in mg/l | |
| Gassing | pH-value | initially | after 10 min. reaction time |
| without | 10.5 | 5.8 | 0.7 |
| 1 | 10.5 | 2.7 | 0.6 |
| 2 | 10.5 | 1.7 | traces |
| 3 | 10.5 | 0.8 | 0 |
| 4 | 10.5 | 1.2 | 0 |
| 5 | 10.5 | 0.8 | 0 |
| 6 | 10.5 | 0.7 | 0 |
| without | 9.3 | 5.8 | 1.2 |
| 1 | 9.3 | 3.5 | 0.4 |
| 2 | 9.3 | 2.1 | traces |
| 3 | 9.3 | 0.8 | traces |
| 4 | 9.3 | 0.8 | 0 |
| 5 | 9.3 | 1.5 | 0 |
| 6 | 9.3 | 1.4 | 0 |

TABLE 2

| Catalyst: | 1 g sodium-hexanitrito-cobalt-(III) and 0.1 g pyrogallol/l hydrazine solution | | |
|---|---|---|---|
| | | Remaining oxygen in mg/l | |
| Gassing | pH-value | Initially | After 10 min. reaction time |
| without | 10.5 | 6.0 | 0.7 |
| 1 | 10.5 | 0.2 | 0 |
| 2 | 10.5 | 0 | 0 |
| 3 | 10.5 | 0 | 0 |
| 4 | 10.5 | 0 | 0 |
| 5 | 10.5 | 0 | 0 |
| 6 | 10.5 | 0 | 0 |
| without | 9.5 | 5.7 | 0.5 |
| 1 | 9.5 | 0.1 | 0 |
| 2 | 9.5 | 0.8 | 0 |
| 3 | 9.5 | 0.1 | 0 |
| 4 | 9.5 | 0 | 0 |
| 5 | 9.5 | 0 | 0 |
| 6 | 9.5 | 0 | 0 |

TABLE 3

Catalyst: 1 g pentaminocobalt-(III)-chloride and 0.1 g oxyhydroquinone/l hydrazine solution

| Gassing | pH-value | Remaining oxygen in mg/l initially | after 10 min. reaction time |
|---|---|---|---|
| without | 10.5 | 5.9 | 0.1 |
| 1 | 10.5 | 1.8 | traces |
| 2 | 10.5 | 0.8 | 0 |
| 3 | 10.5 | 0.3 | 0 |
| 4 | 10.5 | 0.1 | 0 |
| 5 | 10.5 | 0.1 | 0 |
| 6 | 10.5 | 0.1 | 0 |
| without | 9.5 | 5.8 | 0.5 |
| 1 | 9.5 | 2.3 | 0.1 |
| 2 | 9.5 | 2.0 | 0.1 |
| 3 | 9.5 | 0.2 | traces |
| 4 | 9.5 | 0.4 | 0 |
| 5 | 9.5 | 0.4 | 0 |
| 6 | 9.5 | 0.6 | 0 |

TABLE 4

Catalyst: 1 g sodium-hexanitrito-cobalt-(III) and 0.1 g oxyhydroquinone/l hydrazine solution

| Gassing | pH-value | Remaining oxygen in mg/l initially | after 10 min. reaction time |
|---|---|---|---|
| without | 10.5 | 6.1 | 0.05 |
| 1 | 10.5 | 0.4 | traces |
| 2 | 10.5 | 0 | 0 |
| 3 | 10.5 | 0 | 0 |
| 4 | 10.5 | 0 | 0 |
| 5 | 10.5 | 0 | 0 |
| 6 | 10.5 | 0 | 0 |
| without | 9.5 | 5.9 | 2.0 |
| 1 | 9.5 | 3.5 | 1.8 |
| 2 | 9.5 | 3.0 | 0.4 |
| 3 | 9.5 | 0.6 | traces |
| 4 | 9.5 | 0.3 | traces |
| 5 | 9.5 | 1.1 | traces |
| 6 | 9.5 | 1.1 | traces |

EXAMPLE 2

0.1 or 0.5 g. of pyrogallol, phloroglucine or oxyhydroquinone per liter were dissolved in an aqueous hydrazine solution with a content of 220 g. hydrazine per liter, the solution being free of cobalt complex activators. 1 ml of the concomitantly-treated hydrazine solution was mixed with a liter of water-containing oxygen as in Example 1 (after 10 minutes reaction time) and the remaining oxygen content measured.

The temperature was 293° K.

The pH-value of the water was set to be 10.5.

The water was then gassed for 10 minutes by adding air and then again provided with oxygen. This process was repeated several times. The oxygen content was determined immediately following the gassing and after 10 minutes reaction time. The results are shown in Table 5.

TABLE 5

Organic compounds alone being repeatedly gassed
Concentration: 0.5 g/l hydrazine solution, temperature 293° K.

| organic compound | pH-value | Gassing | Remaining oxygen in mg/l initially | after 10 min. reaction time |
|---|---|---|---|---|
| Pyrogallol | 10.5 | without | 4.8 | 3.3 |
| Pyrogallol | 10.5 | 1 | 4.3 | 2.6 |
| Pyrogallol | 10.5 | 2 | 3.6 | 2.8 |
| Pyrogallol | 10.5 | 3 | 3.5 | 2.9 |
| Pyrogallol | 10.5 | 4 | 3.5 | 2.9 |
| Pyrogallol | 10.5 | 5 | 3.5 | 3.3 |
| Pyrogallol | 10.5 | 6 | 3.5 | 3.1 |
| Phloroglucine | 10.5 | without | 4.3 | 3.7 |
| Phloroglucine | 10.5 | 1 | 4.4 | 4.0 |
| Phloroglucine | 10.5 | 2 | 4.3 | 3.7 |
| Phloroglucine | 10.5 | 3 | 4.2 | 3.7 |
| Phloroglucine | 10.5 | 4 | 3.7 | 3.7 |
| Phloroglucine | 10.5 | 5 | 3.7 | 3.7 |
| Phloroglucine | 10.5 | 6 | 4.0 | 3.9 |
| Oxyhydroquinone | 10.5 | without | 4.3 | 0.3 |
| Oxyhydroquinone | 10.5 | 1 | 4.3 | 2.0 |
| Oxyhydroquinone | 10.5 | 2 | 2.8 | 1.7 |
| Oxyhydroquinone | 10.5 | 3 | 3.2 | 2.4 |
| Oxyhydroquinone | 10.5 | 4 | 3.3 | 2.6 |
| Oxyhydroquinone | 10.5 | 5 | 3.4 | 2.3 |
| Oxyhydroquinone | 10.5 | 6 | 3.3 | 2.5 |

We claim:

1. A composition for improving the initial activity of activated hydrazine, with respect to hydrogen dissolved in water, comprising a trivalent cobalt complex with inorganic ligands as complex constituents, together with an added coactivator component selected from the group of trivalent phenols consisting of pyrogallol, oxyhydroquinone, and phloroglucine.

2. An aqueous solution comprising 15 to 25% by volume of hydrazine and 0.05 to 0.5% by weight of a composition according to claim 1.

3. The composition of claim 1 which comprises 5 to 50% by weight of said component with respect to the amount of cobalt complex.

4. The composition of claim 3 which comprises about 10% by weight of said component with respect to the amount of cobalt complex.

5. The composition of claim 1 wherein the cobalt complex is selected from at least one of pentaminocobalt(III) chloride and sodium hexanitritocobalt(III).

6. A process for improving the initial activity of activated hydrazine, with respect to oxygen dissolved in water, which comprises adding to hydrazine a trivalent cobalt complex with inorganic ligands as complex constituents, together with an added coactivator component selected from the group of trivalent phenols consisting of pyrogallol, oxyhydroquinone, and phloroglucine.

7. The process of claim 6 wherein 0.05 to 0.5% by weight of said component is added to an aqueous solution comprising 15 to 25% by volume of hydrazine.

8. The process of claim 6 wherein 5 to 50% by weight of said component, with respect to the amount of cobalt complex, is added.

9. The process of claim 8 in which about 10% by weight of said component, with respect to the amount of cobalt complex, is added.

10. The process of claim 6 wherein the cobalt complex is selected from at least one of pentaminocobalt(III) chloride and sodium hexanitritocobalt(III).

* * * * *